KINESCOPE SOCKET WITH SPARK GAP

Filed July 29, 1968 2 Sheets-Sheet 1

*INVENTORS:*
BRUNO J. LEIMONTAS
EDSON M. PARADISE
BY: Dawson, Tilton, Fallon & Lungmus
ATT'YS March 24, 1970 B. J. LEIMONTAS ET AL 3,502,933

KINESCOPE SOCKET WITH SPARK GAP

Filed July 29, 1968 2 Sheets-Sheet 2

INVENTORS:
BRUNO J. LEIMONTAS
EDSON M. PARADISE
BY: Dawson, Tilton, Fallon & Lungmus
ATT'YS

United States Patent Office 3,502,933
Patented Mar. 24, 1970

3,502,933

KINESCOPE SOCKET WITH SPARK GAP

Bruno J. Leimontas, Morton Grove, and Edson M. Paradise, Highland Park, Ill., assignors to Connector Corporation, Chicago, Ill., a corporation of Illinois

Filed July 29, 1968, Ser. No. 748,433
Int. Cl. H01j *17/00, 21/00*
U.S. Cl. 313—325 12 Claims

ABSTRACT OF THE DISCLOSURE

A spark gap picture tube socket wherein the spacing of the spark gap is maintained constant. The socket includes a socket body which is provided with a plurality of openings for receiving the terminal pins of a television picture tube. A generally L-shaped metal contact is positioned within the socket body in alignment with each of the pin-receiving openings, and a lead wire is connected to each metal contact and extends outwardly from the socket body. An insulating wafer covers the metal contacts, and a metal conducting plate is secured to the insulating wafer outwardly of the metal contacts. Both the wafer and the conducting plate are provided with an opening in alignment with each of the metal contacts, and the diameter of each conducting plate opening is slightly larger than the diameter of the associated wafer opening. A conducting pin having an outside diameter approximately the same as the diameter of the wafer openings is snugly received in each wafer opening. One pin end extends from the wafer into electrical contact with one of the metal contacts, and the other pin end extends through one of the conducting plate openings and is spaced from the periphery of the conducting plate opening to provide a spark gap therebetween.

BACKGROUND

This invention relates to spark gap sockets particularly suitable for television picture tubes.

While spark gap sockets for picture tubes have been provided in the past, these sockets have encountered some difficulties. For example, United States Patents Nos. 3,277,910, 3,240,980, 3,251,016 and 3,377,612, all relate to spark gap sockets. The sockets described in these patents provide a spark gap or electrical spacing between the terminal pin-receiving metal contacts and a conductor ring positioned within the socket body. A common problem with these sockets is that, for a number of reasons, this spacing might not always be accurately maintained. For example, the conductor ring and the various insulating wafers or plates may warp or move axially with respect to the terminal pins and the metal contacts, or the metal contacts may move with respect to the conductor ring. The spark gaps for the voltages involved are relatively small, and a shift in spacing of a few thousandths of an inch changes the voltage breakdown values considerably.

It will be appreciated that when the socket is engaged with the picture tube, the terminal pins of the tube must be forced into the pin-receiving sleeves of the metal contacts, and the position of the metal contacts within the socket body may thereby be changed. Indeed, "float" or free movement of the tube pin contacts in a direction transverse to the tube pins is desirable for self-alignment during the engagement of the picture tube with the socket, as a rigid construction makes the mating a force fit during which the contacts can be distorted causing mechanical pressure on the tube parts and thereby affecting positive electrical contact. This may cause high values of contact resistance and inconsistency of electrical contact which may introduce "noise" in the circuit. Further, after the socket is positioned on the picture tube, the lead wires attached to the metal contacts are then connected to the appropriate components within the television set, and this step may cause the metal contacts to be pulled or twisted slightly out of position. The spacing which provides the spark gap may be typically of the order of thousandths of an inch, and even a slight change in the position of the metal contact with respect to the conductor ring can cause a substantial variance in the voltage at which arcing will occur between these parts.

SUMMARY

The invention solves the foregoing problems by maintaining the two elements between which the spark gap is provided in constant, fixed positions with respect to each other. The spark gap is maintained between the conducting pins which are secured in the insulating wafer and the periphery of the openings in the conducting plate, also secured to the insulating wafer, thereby eliminating movement of one member with respect to the other. The size of the pin and the diameter of the openings in the conducting plate can be very accurately regulated, and the spacing which provides the arc gap can be accurately controlled. The conducting pins maintain electrical engagement with the metal contacts at all times even when the metal contacts move as a result of the normal use of the socket.

DESCRIPTION OF SPECIFIC EMBODIMENT

Figures 1, 2, 3:
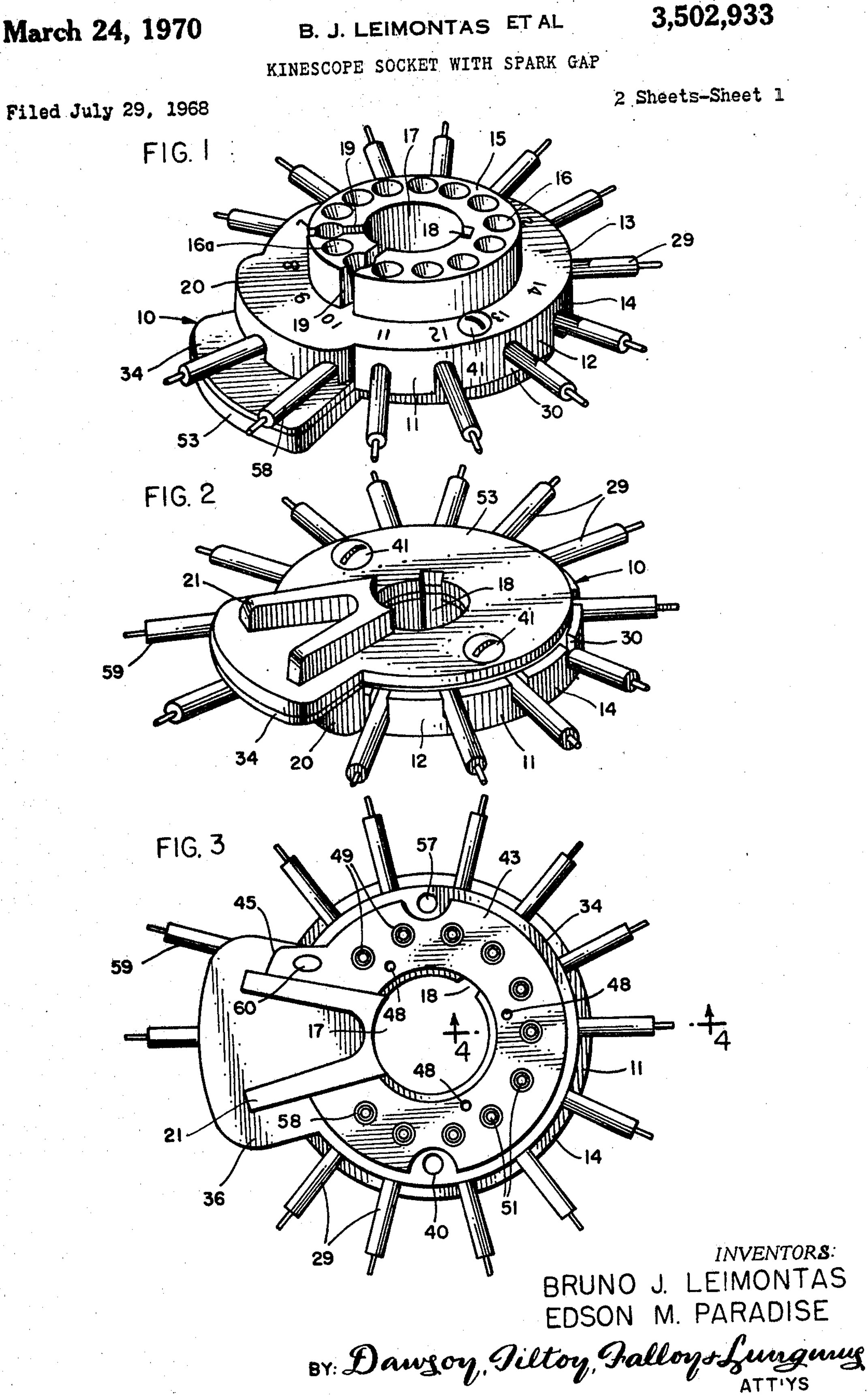
FIG. 1 is a perspective view of a television picture tube socket embodying the present invention.
FIG. 2 is a perspective view of the socket of FIG. 1 from a different angle.
FIG. 3 is a plan view of the socket illustrated in FIG. 2 with the insulating back plate removed.

Referring now to the drawing, the numeral 10 designates generally a television picture tube socket which includes a socket body 11 formed of a suitable insulating material such as polypropylene, general purpose phenolic, glass alkyd, or the like. The socket body 11 includes a base portion 12 having a flat upper surface 13 and a depending perimetric sidewall 14, and a socket portion 15 which extends upwardly from the base portion 12. The socket portion 15 is generally cylindrical and is provided with a plurality of arcuately arranged openings 16 which are adapted to receive the terminal pins of a television picture tube. A central aperture 17 having an axially extending keyway 18 is provided through the socket portion and is adapted to receive the locating pin of the picture tube base.

The particular socket illustrated is intended for use with a picture tube having a high voltage focusing anode which is received in the pin-receiving opening 16*a*. The socket portion 15 is provided with radially extending slots 19 on either side of the opening 16*a* which may receive a barrier wall provided on the tube base to surround the high voltage focusing anode or which may provide an air gap insulation for the high voltage anode. Similarly, the base portion 12 is provided with a radially outwardly extending tab portion 20 which supports the downwardly extending generally U-shaped high voltage barrier wall 21 (FIG. 2). It is to be understood, however, that the invention may also be used with sockets which are not provided with the high voltage barrier wall and which have a base portion 12 which is generally circular in transverse cross section. Such sockets are commonly used on black and white picture tubes.

Figures 4, 5, 6, 7, 9A, 9B:
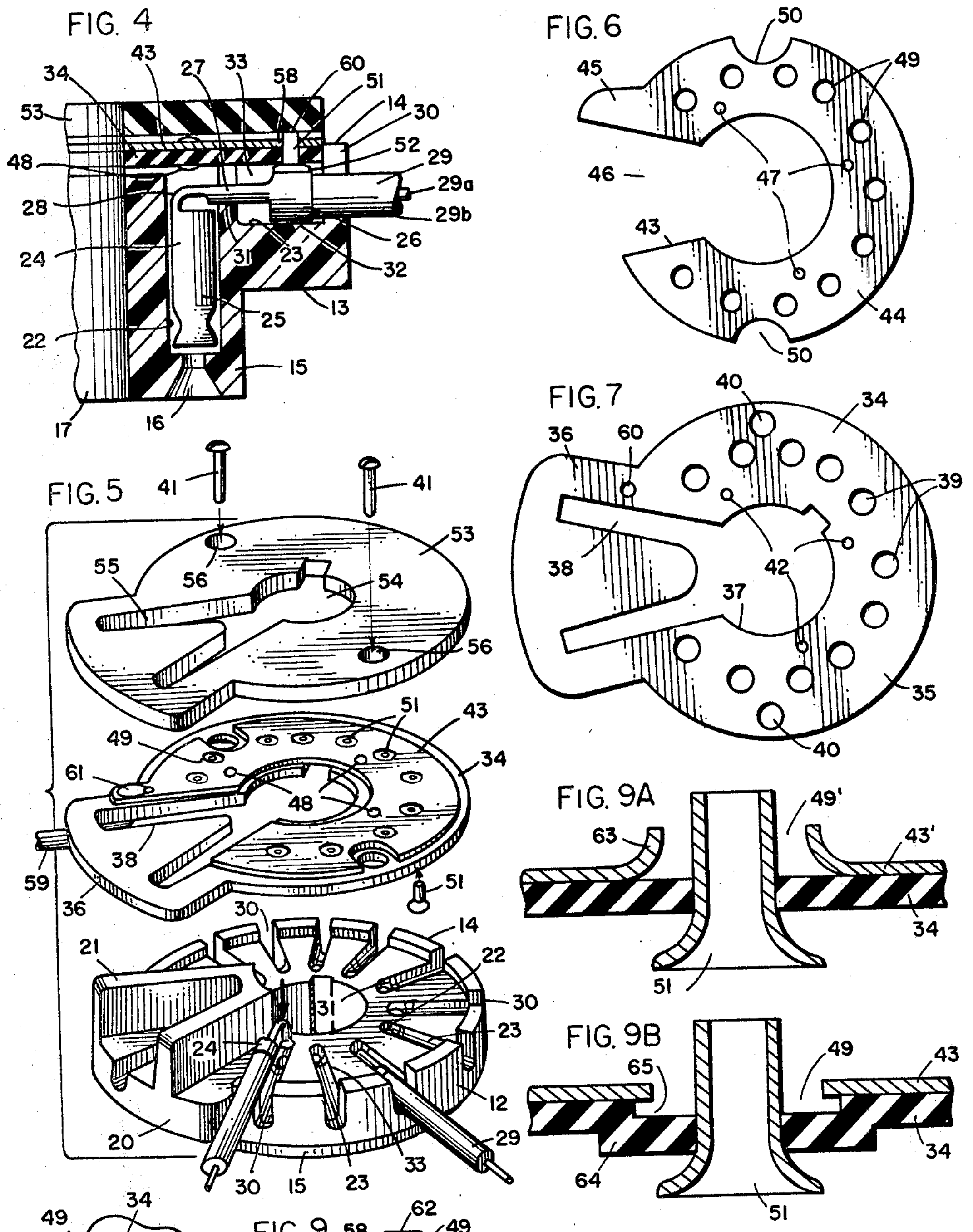
FIG. 4 is a fragmentary sectional view taken along the line 4—4 of FIG. 3.
FIG. 5 is an exploded perspective view of the socket of FIG. 2.
FIG. 6 is a plan view of the conducting plate.
FIG. 7 is a plan view of the insulating wafer with the conducting plate removed.
FIG. 9A is a view similar to FIG. 9 showing a modified form of spark gap.
FIGS. 9B is a view similar to FIGS. 9 and 9A showing a different spark gap.

Referring now to FIGS. 4 and 5, the socket portion 15 is provided with a generally cylindrical bore 22 in axial alignment with each of the openings 16 and a recess 23 extending radially outwardly from each bore 22. A plurality of generally L-shaped metal contacts 24 are received by the socket body, and each metal contact 24 includes a generally tubular portion 25, a clamping portion 26, a sleeve portion 27, and a connecting portion 28. As can be seen best in FIG. 4, the tubular portion 25 of each of the metal contacts 24 is received by a bore 22 and is adapted to receive and engage a terminal pin of the picture tube which is inserted through the opening 16. The sleeve portion 27 and clamping portion 26 serve to connect the metal contact to a lead wire 29 which is provided for each of the terminal pins and which extends through one of the slots 30 in the side wall 14 of the socket. As is well known in the art, the sleeve portion 27 is crimped about the bare wire strands **29*a* of the lead wire, and the clamping portion 26 is crimped about the covering insulation 29*b*** of the lead wire.

The sleeve portion 27 abuts the wall 31 which separates the bore 22 from the recess 23, and the radially enlarged clamping portion 26 is substantially prevented from downward axial movement with respect to the terminal pins as viewed in FIG. 4 by bottom wall 32 of the recess 23. The sides of each recess are defined by vertically extending walls 33, and the distance between the side walls 33 is designed so that the contact may "float" or move somewhat within the recess in a direction transverse to the plane of the L-shaped contact to permit self-alignment of the tubular portion 25 with the pin of the picture tube.

A wafer 34 of insulating material which is shaped to conform to the contour of the side wall 14 of the socket is received by the socket body and covers the metal contacts 24. Referring to FIG. 7, the insulating wafer 34 includes a generally circular portion 35 and a tab portion 36. The wafer is provided with a central aperture 37 corresponding to the central aperture of the socket body and a generally U-shaped slot 38 which receives the barrier wall 21. The wafer 34 is also provided with a plurality of arcuately disposed openings 39, and each of the openings 39 are in general axial alignment with the clamping portion 26 of a metal contact. The wafer also includes somewhat larger openings 40 which are adapted to receive rivets or pins 41 or other suitable attaching means which secure the insulating back plate to the socket body (FIGS. 1 and 2). Disposed radially inwardly of the openings 39 are three plate-attachment openings 42. We have found that by perforating the openings 39, 40, and 42 in the wafer 34 by a punch press, the location and the diameter of these openings can be very precisely controlled.

A metal conducting plate 43 is secured to the insulating wafer 34 outwardly of the metal contacts 24 and includes an arcuate portion 44, which has generally the same shape as the arcuate portion 35 of the insulating wafer, and at least one radially outwardly extending finger portion 45 which extends along one side of the barrier wall 21 (FIG. 3). The conducting plate 43 is interrupted or opened at 46 to permit the plate to be inserted over the barrier wall 21, but it is to be understood that if the socket were not provided with a barrier wall, the conducting plate 43 could be made in a circular or ring shape. The conducting plate is provided with attachment openings 47 which are aligned with the openings 42 of the wafer, and the conducting plate is secured to and aligned with the wafer by attaching rivets 48 which extend through the openings 47 and 42 of the conducting plate and wafer, respectively. Alternatively, the plate could be attached by drawing extrusions in the plate which could be inserted through the wafer and bent over. The conducting plate may also be provided by etching a copper-clad insulating wafer by the well-known printed circuit techniques.

The conducting plate 43 is provided with spark gap openings 49 which are concentric with the openings 39 of the wafer and which have a diameter slightly greater than the diameter of the openings 39. The radial dimension of the conducting plate 43 is somewhat less than that of the wafer 34, and the outer periphery of the arcuate portion 44 is provided with notches 50 through which the rivets 41 pass. The size and position of the openings in the plate 43 can be accurately controlled by making the openings with a punch press.

A metal conducting eyelet or pin 51 is received by each of the wafer openings 39, and preferably each pin is sized to be snugly received by the wafer openings. The particular pins illustrated are generally tubular in shape, and the outside diameter of each pin is approximately the same as the diameter of the wafer openings 39. One end of each pin may be flared outwardly as at 52, and the flared end gives a broad base for electrical contact with the L-shaped contact.

The socket is completed by a back plate 53 of suitable insulating material which is shaped somewhat the same as the insulating wafer 34 and which is also received by the depending side wall 14 of the socket body or positioned adjacent the edge thereof to cover the conducting plate 43. The back plate 53 similarly is provided with a central opening 54, a generally U-shaped slot 55 which receives the barrier wall 21, and a pair of rivet openings 56. The back plate, conducting plate, and insulating wafer are firmly secured to the socket body and pressed toward the metal contacts 24 by attaching rivets or eyelets 41 which pass through the rivet openings 56, 50, and 40 of these parts and through rivet openings 57 provided in the flat surface 13 of the socket body.

After the back plate is secured to the socket body, the flared end 52 of each conducting pin 41 presses somewhat firmly against the clamping portion of its associated metal contact, and each pin is always maintained in electrical engagement with its associated metal contact. The flared ends 52 of the conducting pins 51 provide a relatively large contacting area for the pins, and the pins and metal contacts will remain in electrical engagement even if the contacts move somewhat in the transverse direction. The spacing 58 (FIGS. 4, 8, and 9) between each pin 51 and the periphery of the associated spark gap opening 49 of the conducting plate define the spark gap for each of the tube terminals, and, since both the pins 51 and the conducting plate 43 are secured to the insulating wafer 34, the dimensions of the spark gaps remain constant. The desired position of the conducting pins 51 relative to the metal contacts is maintained by the wafer 34 which is aligned with respect to the contacts by the rivets 41.

In one specific embodiment of the invention, the wafer openings 39 had a diameter of about .063 inch and the spark gap openings 49 in the conducting plate had a diameter of about .110 inch to provide a spark gap of about .0235 inch between each conducting pin and the conducting plate. The breakdown voltage for this spark gap was found to be about 1800 volts. However, it is to be understood that this spacing may be varied depending upon the voltage characteristics of the particular picture tube and the voltage at which arcing is desired. Further, the spark gap spacing associated with each terminal pin may vary from one terminal pin to another as desired. The insulating wafer was formed of melamine and had a thickness of $\frac{1}{32}$ inch. We have found that a wafer of such thickness is relatively flexible and, if the clamping portions 26 of the metal contacts do not all lie in the same plane, the wafer will readily conform when the back plate is attached to ensure proper engagement of each conducting pin with its associated metal contact.

The spark gap for the high vonltage focusing anode which is received by the terminal-receiving opening **16*a* is provided by the finger portion 45 of the conducting plate which extends along one side of the high voltage barrier wall 21. The voltage at which arcing will occur can be varied by varying the length of the finger portion, and arcing will occur from the metal contact associated with the high voltage focusing anode around the barrier wall to the outer end of the finger portion 45. The conducting plate 43 may be connected to ground by ground wire 59 which may extend through an opening 60 (FIG. 7) in the insulating wafer and is suitably secured to the finger portion 45 of the conducting plate as by soldering at 61**. Mechanical attachment of the ground wire to the conducting plate may also be used if desired.

Figures 8, 9:
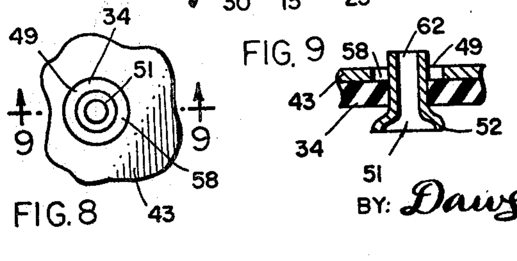
FIG. 8 is an enlarged fragmentary view of FIG. 3 showing one of the spark gaps.
FIG. 9 is a sectional view taken along the line 9—9 of FIG. 8.

Referring to FIGS. 4 and 9, the end 62 of the conducting pin 51 which extends through the spark gap opening of the conducting plate may extend slightly beyond the plane of the conducting plate. By so forming the pin, it is believed that arcing will generally occur in a plane at the top of the conducting plate between the periphery of the spark gap openings 49 and the pins rather than at the level where the conducting pin extends upwardly from the wafer 34. We also believe that superior results are obtained by providing the spark gap between rounded surfaces such as the periphery of the spark gap openings 49 and the tubular pins 51 than by providing the spark gap between relatively sharp or pointed edges or flat-faced surfaces. A further reason for having the upper pin end 62 extend above the plane of the conducting plate 43 is to insure that the flared ends 52 of the pins are pressed into firm electrical engagement with the metal contacts 24 when the back plate is secured.

FIGS. 9A and 9B illustrate modifications of the conducting plate and insulating wafer which may be used to alter the plane of the arc path. In FIG. 9A the insulating wafer 34 receives the tubular pins 51 in the manner hereinbefore described. However, the openings 49′ in the conducting plate 43′ are formed by drawing the metal conducting plate rather than cleanly punching a hole in the plate so that an upwardly extending perimetric extrusion 63 surrounds the pin 51. The inside diameter of the extrusion 63 can be accurately maintained, and arcing will generally occur at the shortest distance between the conducting plate and the pin, which is adjacent the top of the extrusion 63, well above the insulating wafer 34.

The wafer 34′ illustrated in FIG. 9B was half punched to provide a depressed portion 64 through which the pin 51 is inserted. The half punching step provides a spacing 65 between the conducting plate 43 and the insulating wafer adjacent the periphery of the openings 49 in the conducting plate, and arcing will generally occur from the conducting plate straight across to the pins 51 above the insulating wafer.

Although we have described the openings 49 in the conducting plate as completely circular, the openings may also be in the form of arcuate notches formed in the periphery of the plate.

While in the foregoing specification a specific embodiment of our invention was described in considerable detail for the purpose of illustration, it is to be understood that many of the details hereingiven may be varied considerably by those skilled in the art without departing from the spirit and scope of the invention.

We claim:

1. A kinescope tube socket comprising (a) a socket body formed of insulating material, said socket body being provided with a plurality of terminal pin-receiving openings, (b) a metal contact within said socket body for each of the terminal pin-receiving openings, one end of each of said metal contacts adapted to receive a terminal pin of a kinescope tube, (c) an insulating wafer received by said socket body, said insulating wafer being provided with a plurality of openings, each of said openings being generally aligned with a metal contact, (d) a metal conducting plate secured to said insulating wafer and spaced from said metal contacts by the wafer, said conducting plate being provided with a plurality of openings, each of the insulating wafer openings being generally aligned with an opening in the conducting plate, (e) a metal conducting pin received by each of said insulating wafer openings, each conducting pin extending through the insulating wafer and providing a pair of pin ends, one end of each conducting pin being in electrical contact with one of the metal contacts and the other end of each conducting pin being spaced from the periphery of the associated conductor plate opening to provide a spark gap.

2. The socket of claim 1 wherein said insulating wafer openings and said conducting plate openings are generally circular and each of said conducting pins is generally cylindrical and has a diameter approximately equal to the diameter of the associated wafer opening, said one pin end being flared outwardly, the diameter of each conducting plate opening being slightly greater than the diameter of the associated wafer opening.

3. The socket of claim 2 wherein each of the other pin ends extend from said wafer slightly beyond the plane of the conducting plate.

4. The socket of claim 1 including an insulated lead wire for each of said metal contacts, each metal contact including a sleeve portion crimped about the lead wire in electrical contact therewith and an enlarged clamp portion crimped about the insulation of the lead wire, each of said one pin ends engaging said enlarged clamp portion.

5. The socket of claim 1 wherein said metal contacts are movable in a direction generally parallel to the plane of said insulating wafer, each of said conducting pins being generally cylindrical and said one pin end being flared outwardly to maintain electrical engagement with the associated metal contact as the contact moves.

6. The socket of claim 1 wherein said conducting plate includes an extruded portion surrounding each of the conducting plate openings and extending from the plane of the conducting plate away from the insulating wafer, the other end of each pin extending away from said wafer and being spaced from the associated extruded portion to provide the spark gap.

7. The socket of claim 1 wherein said insulating wafer includes a depressed portion surrounding each of the wafer openings and spaced from the conducting plate, said spark gaps being provided from the conducting plate to the pins above the depressed portions of the wafer.

8. A picture tube socket comprising:

(a) a socket body formed of insulating material, said socket body having a generally planar base portion and a socket portion extending from the base portion and provided with a plurality of terminal pin-receiving openings, (b) a generally L-shaped metal contact within said socket body for each of the terminal pin-receiving openings, one end of each of said metal contacts adapted to receive a terminal pin of a picture tube, (c) an insulating wafer received by said socket body, said wafer being provided with a plurality of arcuately disposed generally circular openings, each of said openings being generally aligned with the other end of a metal contact, (d) a metal conducting plate secured to said insulating wafer and spaced from said metal contacts by the wafer, said conducting plate being provided with a plurality of generally circular openings, each of the insulating wafer openings being concentric with an opening in the conducting plate and having a diameter less than the diameter of the associated conductor plate opening, (e) a metal conducting pin received by each of said insulating wafer openings, each conducting pin extending through the insulating wafer and providing a pair of pin ends, each conducting pin having an enlarged end in electrical contact with one of the metal contacts, the remainder of each conducting pin being generally cylindrical and having a diameter approximately the same as the diameter of the associated wafer opening, the cylindrical portion of each pin being spaced from the periphery of the associated conducting plate opening to provide a spark gap.

9. The socket of claim 8 wherein each of the other conducting pin ends extends from the insulating wafer slightly beyond the plane of the conducting plate.

10. The socket of claim 8 including an insulated lead wire attached to the other end of each of said metal contacts, the other end of each metal contact including a sleeve portion crimped about the lead wire in electrical contact therewith and an enlarged clamp portion crimped about the insulation of the lead wire, each of said enlarged conducting pin ends engaging the enlarged clamp portion of a metal contact.

11. In a picture tube socket having a socket body and a plurality of metal contacts within the socket body, said socket body being provided with a plurality of terminal pin-receiving openings, each of said metal contacts being aligned with one of said terminal pin-receiving openings, the improvement comprising an insulating wafer received by the socket body and having a plurality of openings, each of said wafer openings being generally aligned with a metal contact, a metal conducting plate secured to said wafer and spaced from said metal contacts by the wafer, said conducting plate being provided with a plurality of openings, each of the insulating wafer openings being generally aligned with an opening in the conducting plate a metal conducting pin received by each of said wafer openings and providing a pair of pin ends, one end of each pin engaging one of the metal contacts and the other end of each pin being spaced from the periphery of the associated conductor plate opening.

12. The socket of claim 11 wherein each of said conducting pins is generally cylindrical and has a diameter approximately equal to the diameter of the associated wafer opening, said one pin end being flared outwardly, the diameter of each conducting plate opening being slightly greater than the diameter of the associated wafer opening.

References Cited

UNITED STATES PATENTS

| | | | |
|---|---|---|---|
| 2,963,617 | 12/1960 | Gray | 315—20 |
| 3,227,910 | 1/1966 | Pittman | 313—318 |
| 3,240,980 | 3/1966 | Schuster | 313—318 |
| 3,251,016 | 5/1966 | Manetti et al. | 313—318 X |
| 3,377,612 | 4/1968 | Klier et al. | 313—325 X |

FOREIGN PATENTS

| | | |
|---|---|---|
| 1,314,531 | 12/1962 | France. |
| 1,148,025 | 5/1963 | Germany. |
| 373,873 | 5/1939 | Italy. |

JOHN W. HUCKERT, Primary Examiner

A. J. JAMES, Assistant Examiner

U.S. Cl. X.R.

313—326; 339—143, 144; 315—36; 328—8